(12) United States Patent
Soh et al.

(10) Patent No.: US 8,711,092 B2
(45) Date of Patent: Apr. 29, 2014

(54) POINTING DEVICE, DISPLAY APPARATUS AND POINTING SYSTEM, AND LOCATION DATA GENERATION METHOD AND DISPLAY METHOD USING THE SAME

(75) Inventors: Byung-seok Soh, Hwaseong-si (KR); Sang-on Choi, Suwon-si (KR); Im-su Choi, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1159 days.

(21) Appl. No.: 12/646,219

(22) Filed: Dec. 23, 2009

(65) Prior Publication Data

US 2010/0315332 A1  Dec. 16, 2010

(30) Foreign Application Priority Data

Jun. 13, 2009 (KR) .................. 10-2009-0052606

(51) Int. Cl.
*G06F 3/033* (2013.01)
*G09G 5/08* (2006.01)

(52) U.S. Cl.
USPC ................................................ 345/157

(58) Field of Classification Search
None
See application file for complete search history.

(56) References Cited

U.S. PATENT DOCUMENTS

2003/0063065 A1* 4/2003 Lee et al. .............. 345/156
2008/0191973 A1* 8/2008 Rhee ..................... 345/67

* cited by examiner

*Primary Examiner* — Nicholas Lee
(74) *Attorney, Agent, or Firm* — Sughrue Mion, PLLC

(57) ABSTRACT

A pointing device, a display apparatus and a pointing system, and a location data generation method and a display method using the same are provided. The pointing device includes a sensor that detects signals, a storage unit which stores a signal pattern and a controller which generates location data corresponding to a time at which a signal is detected. Using the detected signals, it is possible to more precisely determine a location of the pointing device on a display apparatus, and to minimize errors caused by delays that may occur when the pointing device is wirelessly connected to the display apparatus.

23 Claims, 11 Drawing Sheets

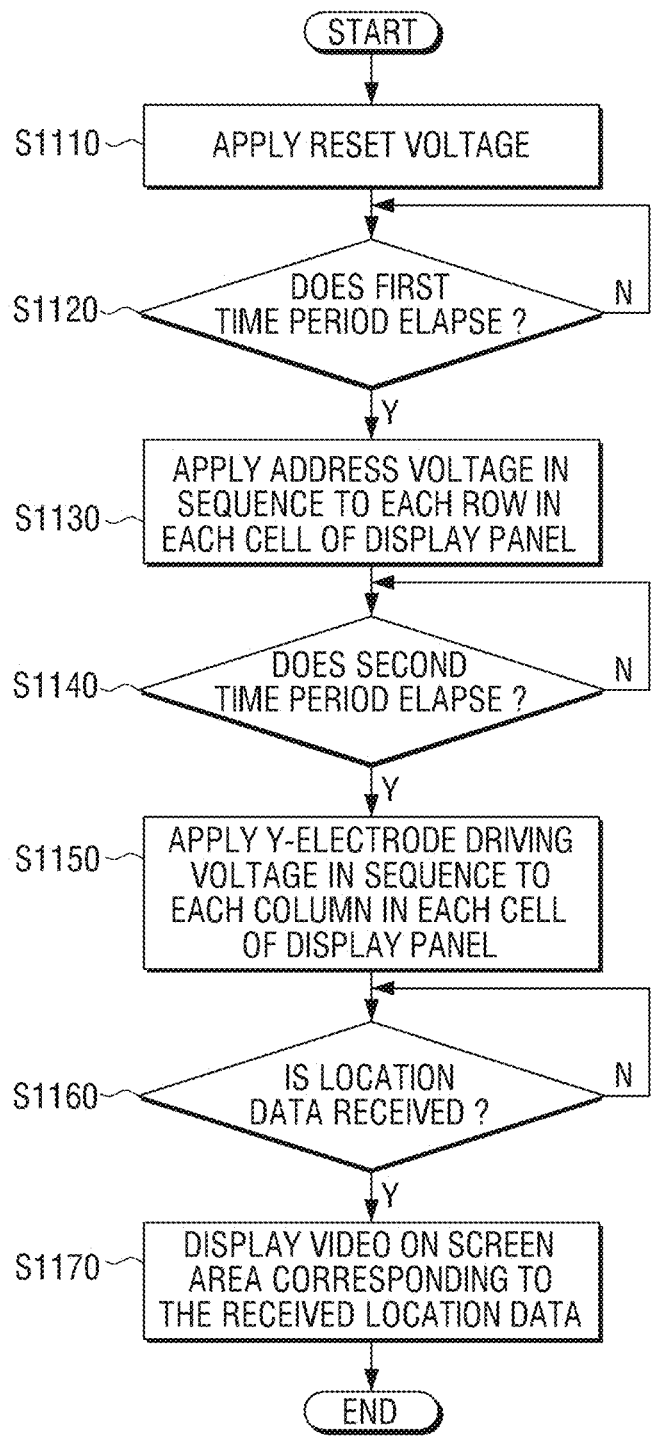

POINTING DEVICE, DISPLAY APPARATUS AND POINTING SYSTEM, AND LOCATION DATA GENERATION METHOD AND DISPLAY METHOD USING THE SAME

CROSS-REFERENCE TO RELATED APPLICATIONS

This application claims priority from Korean Patent Application No. 10-2009-0052606, filed on Jun. 13, 2009, in the Korean Intellectual Property Office, the disclosure of which is incorporated herein by reference in its entirety.

BACKGROUND OF THE INVENTION

1. Field of the Invention

Apparatuses and methods consistent with the present invention relate to a pointing device, a display apparatus and a pointing system, and a location data generation method and a display method using the same. More particularly, apparatuses and methods consistent with the present invention relate to a pointing device, a display apparatus and a pointing system, which enable a video to be displayed using location data of the pointing device, and a location data generation method and a display method using the same.

2. Description of the Related Art

Electronic blackboards and electronic pens may be used for presenting lectures, presenting conferences, studying, or games. Further, electronic blackboards enable lectures or the like to be conducted in a low cost, clean environment, whereas general blackboards require consumables, such as pens or chalk.

Additionally, it is easy to convert writings on the electronic blackboards into data, and to transceive or edit the data, and thus electronic blackboards have superior functionality compared to conventional blackboards. Accordingly, electronic blackboards are commercially advantageous.

However, there are many improvements that need to be made to expand the use of electronic blackboard systems. For example, content input by users' manipulation of electronic pens needs to be displayed on electronic blackboards more instantly and accurately. In particular, electronic blackboards respond slowly to a user's manipulation of electronic pens, and content different from the content input by a user's electronic pen may be displayed on electronic blackboards, which is inconvenient for users. Additionally, such problems are accentuated when an electronic blackboard system is operated with a wireless connection.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a pointing device, a display apparatus and a pointing system, and a location data generation method and a display method using the same, that more precisely extract a location indicated by the pointing device and minimize errors caused by communication delays, which may occur when the pointing device is wirelessly connected to the display apparatus.

According to an aspect of the present invention, there is provided a pointing device comprising a sensor which detects a first signal and a second signal, a storage unit which stores a preset signal pattern, and a controller which generates a first pattern that represents a time at which the first signal is detected, compares the preset signal pattern to the first pattern, and generates location data corresponding to a time at which the second signal is detected according to a result of comparison.

The controller may set the time at which the first signal is detected to be a reference time, and generate location data corresponding to the time at which the second signal is detected.

If the preset signal pattern is at least partly identical to the first pattern, the controller may generate the location data.

The second signal may comprise an X-axis signal related to an X-axis location of the pointing device on a display and a Y-axis signal related to a Y-axis location of the pointing device on the display. The controller may generate X-axis location data of the pointing device based on a difference between the time at which the first signal is detected and a time at which the X-axis signal is detected, and may generate Y-axis location data of the pointing device based on a difference between a time at which the first signal is detected and a time at which the Y-axis signal is detected.

The location data may comprise information that indicates a point where the pointing device is located on a surface of a display.

The first signal may be an electromagnetic interference (EMI) signal which is detected from a display.

The second signal may be an infrared (IR) signal which is detected on the point where the pointing device is located on a surface of a display.

The pointing device may further comprise a communication interface which transmits the location data to a display connected to the pointing device.

The controller may determine a location of the pointing device on the display based on the location data, and may control the determined location to be transmitted via the communication interface to the display.

The first signal and the second signal may be signals having values equal to or greater than a preset threshold among signals detected from a display.

According to another aspect of the present invention, there is provided a display apparatus comprising a display panel, a driving unit which applies a driving voltage to the display panel, and a controller which controls the driving unit to apply the driving voltage to the display panel at a first time and at a second time so that a first signal having a first pattern is emitted when the driving voltage is applied at the first time and a second signal is emitted when the driving voltage is applied at the second time.

The second signal may comprise a first infrared (IR) signal which is sequentially emitted from rows of cells of the display panel, and a second IR signal which is sequentially emitted from columns of cells of the display panel.

The first IR signal may be emitted at regular intervals from each row of cells of the display panel, and the second IR signal may be emitted at regular intervals from each column of cells of the display panel.

The controller may control the first IR signal to be emitted after a first preset period of time elapses based on the first signal, and may control the second IR signal to be emitted after a second preset period of time elapses based on the first signal.

The controller may control the first signal and the second signal to be emitted in a predetermined subfield among a plurality of subfields forming a single frame of a video.

The predetermined subfield may be disposed on a foremost portion of the frame.

The predetermined subfield may not contain video data, and the other subfields may contain video data.

The controller may control the first signal to be emitted in a reset period of a cell provided in the display panel, and may control the second signal to be emitted in an address period of the cell.

The first signal may be an electromagnetic interference (EMI) signal which is emitted in response to the applied driving voltage.

The display apparatus may further comprise a communication interface which receives location data regarding a location of an external device on the display apparatus from the external device. The controller may control the display panel to display an output at the location using the received location data.

According to another aspect of the present invention, there is provided a pointing system comprising a display apparatus which emits a first signal having a preset pattern, emits a second signal, and displays an output at a location on the display apparatus corresponding to position data received from an external device; and a pointing device which contacts the display apparatus, detects the first signal and second signal, generates the position data regarding the location of the display apparatus in contact therewith using the detected first signal and second signal, and transmits the generated position data to the display apparatus.

The pointing device may store a preset signal pattern. If the preset signal pattern is at least partly identical to the first pattern, the pointing device may generate the position data regarding the location of the display apparatus in contact therewith using a time at which the second signal is detected.

According to another aspect of the present invention, there is provided a location data generation method comprising storing a preset signal pattern, detecting a first signal and generating a first pattern that represents a time at which the first signal is detected, comparing the preset signal pattern to the first pattern, and generating, if a second signal is detected, location data corresponding to a time at which the second signal is detected according to a result of comparison.

According to another aspect of the present invention, there is provided a display method comprising applying a first driving voltage and emitting an electromagnetic interference (EMI) signal having a preset pattern based on the first driving voltage, applying a second driving voltage and emitting a first infrared (IR) signal based on the second driving voltage, applying a third driving voltage and emitting a second IR signal based on the third driving voltage, and receiving location data generated based on the EMI signal, the first IR signal and the second IR signal, and displaying an output at a location of a display corresponding to the received location data.

According to another aspect of the present invention, there is provided a display method comprising emitting a first signal having a first pattern, emitting a second signal, detecting the first signal and second signal, and generating, if the first pattern is at least partly identical to a pre-stored pattern, data regarding a location on a display in which the first signal and second signal are detected based on the second signal, and displaying an output based on the generated data at the location.

BRIEF DESCRIPTION OF THE DRAWINGS

The above and other aspects of the present invention will be more apparent by describing certain exemplary embodiments of the present invention with reference to the accompanying drawings, in which:

FIG. 11 is a flowchart explaining a process by which a DTV applies a driving voltage, receives location data and displays a video according to an exemplary embodiment of the present invention.

DETAILED DESCRIPTION OF EXEMPLARY EMBODIMENTS

Figure 1:
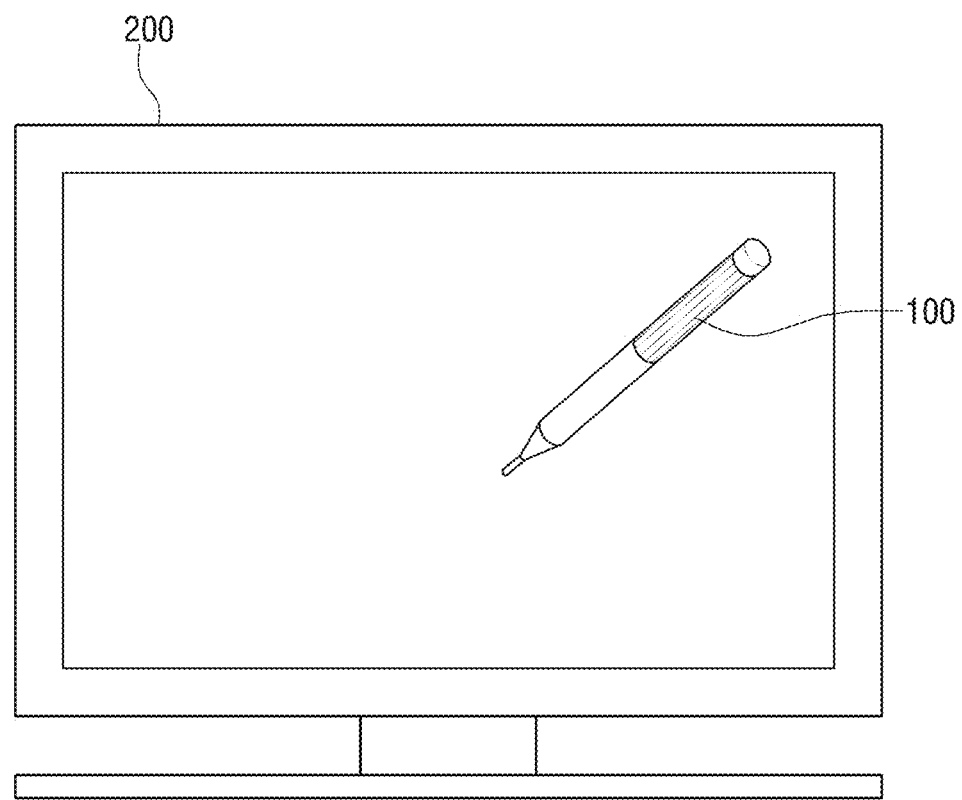
FIG. 1 is a view illustrating a pointing system to which the present invention is applicable.

Certain exemplary embodiments of the present invention will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a view illustrating a pointing system to which the present invention is applicable. The pointing system of FIG. 1 comprises a pointing device 100 and a digital television (DTV) 200.

The pointing device 100 is a kind of electronic pen which enables videos, texts or graphics to be displayed on a screen area of the DTV 200 according to a user's manipulation. The pointing system may be used for conferences, presentations, lectures, studying or games.

The pointing device 100 is used to input information according to the user's manipulation. Accordingly, a user may manipulate the pointing device 100 on a screen of the DTV 200, so that a desired video may be displayed on the screen, for example.

More specifically, if a user allows the pointing device 100 to come in contact with or touch a desired screen area on the DTV 200, videos, texts or graphics may appear on the desired screen area.

When the user contacts the pointing device 100 with the DTV 200, the pointing system shown in FIG. 1 is operated in a signal detection mode to detect a signal output from the DTV 200 and compute a location of the pointing device 100 on the screen of the DTV 200 in real time based on the detected signal. On the other hand, the pointing system may be operated in a pressure detection mode, in which the DTV 200 detects pressure applied by touch, or in an electrostatic detection mode, in which the DTV 200 detects electrostatic charge generated when the pointing device comes in contact with the DTV 200.

The signal detection mode, pressure detection mode, and electrostatic detection mode may be used in combination with each other.

The DTV 200 is a kind of display apparatus, and more specifically, a display apparatus employing a plasma display panel with a plasma mode. The DTV 200 processes a video received from a source over a wire or wirelessly, and outputs the processed video. Additionally, the DTV 200 may be connected to the pointing device 100 so that the DTV 200 may be used as an electronic blackboard, and thus the DTV 200 may be controlled to operate in response to user's manipulation of the pointing device 100.

In more detail, if the pointing device 100 comes into contact with the DTV 200, the DTV 200 generates a signal and outputs the generated signal to the pointing device 100 so that the pointing device 100 detects the signal. Subsequently, if the pointing device 100 generates its own location data using the detected signal, the DTV 200 receives the generated location data from the pointing device 100, and controls videos, texts or graphics to be displayed on a screen area corresponding to the received location data.

A process by which the pointing device 100 generates its own location data and the DTV 200 generates a signal to enable generation of the location data will be described in detail below.

The DTV 200 is an exemplary display apparatus used as an electronic blackboard, but this is merely an example for convenience of description. Accordingly, the present invention is also applicable to a situation in which a separate display apparatus, such as a monitor or other display device, is used.

Figure 2:
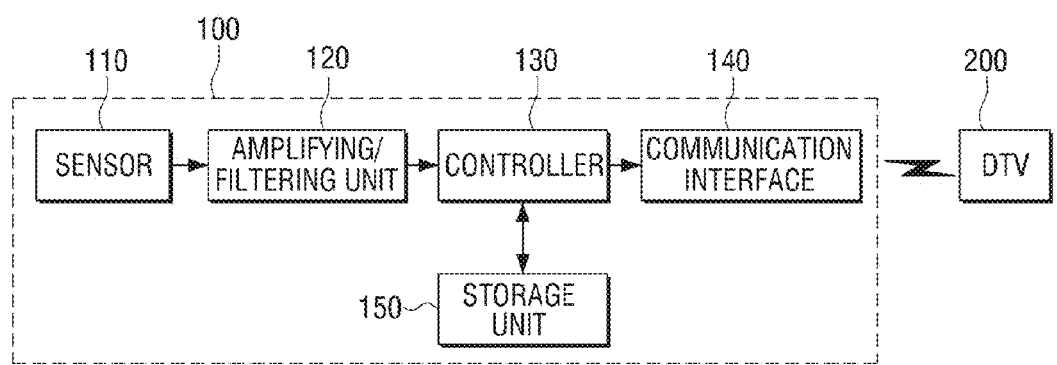
FIG. 2 is a block diagram of a pointing device according to an exemplary embodiment of the present invention.

FIG. 2 is a block diagram of the pointing device 100 according to an exemplary embodiment of the present invention. For convenience of description, FIG. 2 also illustrates the DTV 200 in addition to the pointing device 100. As shown in FIG. 2, the pointing device 100 comprises a sensor 110, an amplifying/filtering unit 120, a controller 130, a communication interface 140 and a storage unit 150.

The sensor 110 is used to detect an electromagnetic interference (EMI) signal and an infrared (IR) signal. The sensor 110 is disposed in a front part or distal end of the pointing device 100, and detects an EMI signal and IR signal output from part of the screen area of the DTV 200. The sensor 110 transfers the detected EMI signal and IR signal to the amplifying/filtering unit 120.

The amplifying/filtering unit 120 amplifies the EMI signal and IR signal output from the sensor 110, removes noise from the amplified signals, and re-amplifies the signals from which noise is removed, in order to clarify wavelength fluctuation. The re-amplified signals are transferred to the controller 130.

The controller 130 controls overall operations of the pointing device 100, and may be a central processing unit (CPU) or the like, for example. In particular, the controller 130 extracts signals having values equal to or greater than a preset threshold among the re-amplified signals received from the controller 130, and compares a pattern of the extracted signals to a pattern stored in the storage unit 150, which will be described below. Additionally, the controller 130 controls location data to be generated according to a result of comparison.

In more detail, the controller 130 compares patterns of signals among the re-amplified EMI signals, which have values equal to or greater than the threshold, with the patterns stored in the storage unit 150. After comparison, if it is determined that both of the patterns are partly or completely identical, the controller 130 sets one of the signals having values equal to or greater than the threshold to be a reference signal. Additionally, the controller 130 computes a time difference between when the reference signal is received and when the re-amplified IR signal is received, and generates location data regarding the location where the pointing device 100 appears on the DTV 200 using the computed time difference. A process of generating location data will be described in detail below.

The controller 130 transfers the generated location data to the DTV 200 via the communication interface 140.

The storage unit 150 stores a program and data required to operate the pointing device 100, and also stores a pattern to be compared with the pattern of signals having values equal to or greater than the threshold. More specifically, the pattern stored in the storage unit 150 is a pattern of an EMI signal generated by a reset voltage applied for resetting a discharge cell before a single frame of video is displayed on the DTV 200. The storage unit 150 may be a memory, such as a flash memory, a read only memory (ROM), a random access memory (RAM), or the like.

The pattern of the EMI signal is formed at the same timing every time the reset voltage is applied, so if the pointing device 100 determines whether the stored pattern is identical to the pattern of the received signal, and if so, the pointing device 100 may generate location data using the received signal as a reference signal. The process of generating location data will be described in detail below.

Figure 3:
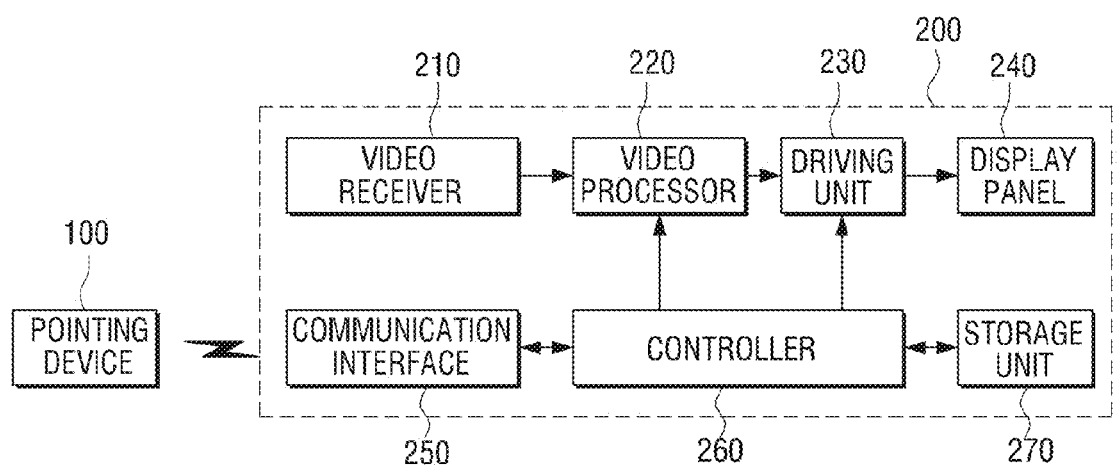
FIG. 3 is a block diagram of a digital television (DTV) according to an exemplary embodiment of the present invention.

FIG. 3 is a block diagram of the DTV 200 according to an exemplary embodiment of the present invention. The DTV 200 of FIG. 3 comprises a video receiver 210, a video processor 220, a driving unit 230, a display panel 240, a communication interface 250, a controller 260 and a storage unit 270. For convenience of description, FIG. 3 also illustrates the pointing device 100 in addition to the DTV 200.

The video receiver 210 receives a broadcast signal provided by a broadcast source, a video signal provided by an external device connected via wire or wirelessly to the DTV 200, or a video signal stored in a storage medium or the storage unit 270 in the DTV 200. The video receiver 210 transfers the received broadcast signal or video signal (hereinafter, are collectively referred to as a 'video signal') to the video processor 220.

The video processor 220 performs signal processing, such as video separation, video decoding or video scaling, with respect to the video signal received from the video receiver 210. Additionally, the video processor 220 generates a video signal based on data received from the controller 260. More specifically, the video signal generated by the video processor 220 enables videos, texts or graphics to be displayed on a screen area of the DTV 200 corresponding to the location of the pointing device 100 based on the location data of the pointing device 100 which is received from the controller 260. Furthermore, the video processor 220 transfers the processed video signal to the driving unit 230.

The driving unit 230 drives the display panel 240 to display an output corresponding to the video signal received from the video processor 220 on the screen of the DTV 200, so that the display panel 240 provides a user with a viewable video. Functions of the driving unit 230 and display panel 240 will be described in detail with reference to FIG. 4 below.

The communication interface 250 is communicably connected to the pointing device 100, and receives the location data of the pointing device 100 from the pointing device 100. Herein, the location data of the pointing device 100 refers to data regarding the location where the pointing device 100 contacts the display panel 240 of the DTV 200. The communication interface 250 transfers the location data received from the pointing device 100 to the controller 260.

The controller 260 controls overall operations of the DTV 200, and may be a central processing unit (CPU) or the like, for example. In more detail, the controller 260 controls the video processor 220 to perform signal processing on the video signal received from the video receiver 210, and controls the driving unit 230 so that a driving voltage is generated in response to the processed video signal and applied to the display panel 240. Accordingly, the display panel 240 may display a video corresponding to the video signal output from the controller 260.

Additionally, the controller 260 analyzes the location data of the pointing device 100 received through the communication interface 250 from the pointing device 100, generates a signal based on a result of analysis, and transfers the generated signal to the video processor 220. Subsequently, the video processor 220 generates a video signal to allow videos, texts or graphics to be displayed on a screen area of the DTV 200 corresponding to the location of the pointing device 100 based on the location data received from the controller 260.

Furthermore, the controller 260 controls the driving unit 230 so that the driving voltage generated by the driving unit 230 is transferred to the display panel 240. In particular, the controller 260 controls the driving unit 230 so that a driving voltage is generated to allow an EMI signal and IR signal to be emitted in a predetermined pattern on the display panel 240.

In a predetermined reset period in a plurality of subfields forming a single frame of video, the driving unit 230 applies a reset voltage to the display panel 240 to reset electric charges remaining after cell discharge. In this situation, a large EMI signal may be emitted from the display panel 240. Additionally, in a predetermined address period in the plurality of subfields, the driving unit 230 applies an address voltage to the display panel 240, so that an IR signal is emitted from the display panel 240. Such emission of EMI signals and IR signals will be described with reference to FIG. 8 below.

The storage unit 270 stores various programs and data required to operate the DTV 200. The storage unit 270 may be a memory, such as a flash memory, a read only memory (ROM), a random access memory (RAM), or the like.

Figure 4:
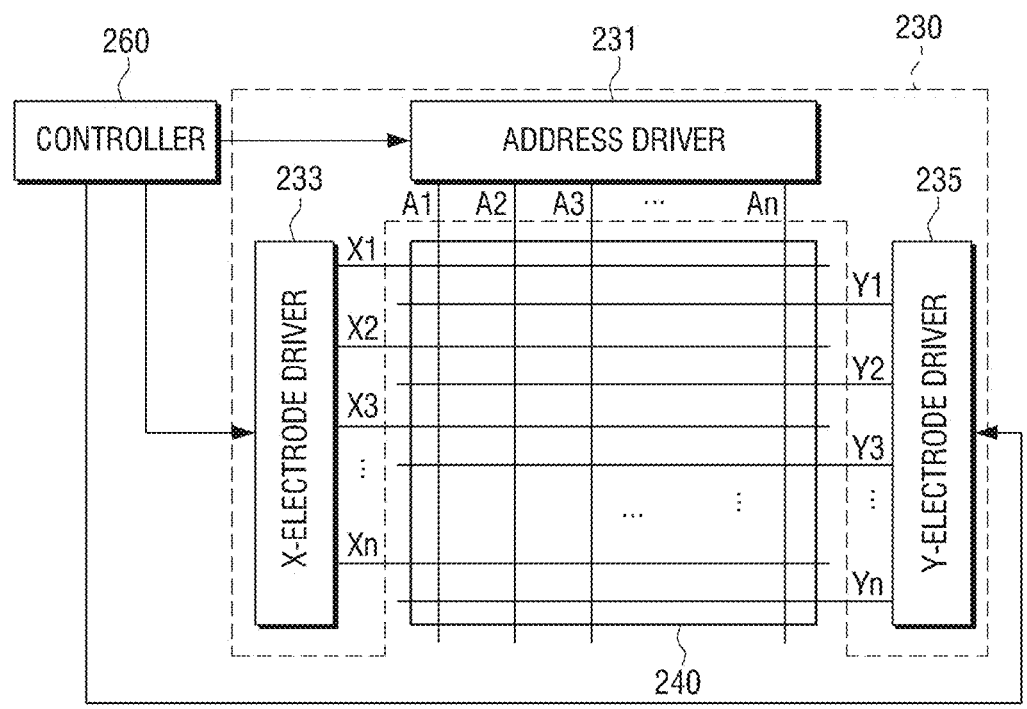
FIG. 4 is a schematic plane view illustrating a driving unit and a display panel according to an exemplary embodiment of the present invention.

FIG. 4 is a schematic plane view illustrating the driving unit 230 and the display panel 240 according to an exemplary embodiment of the present invention. For convenience of description, FIG. 4 also illustrates the controller 260 in addition to the driving unit 230 and the display panel 240. In FIG. 4, the driving unit 230 comprises an address driver 231, an X-electrode driver 233 and a Y-electrode driver 235.

The display panel 240 comprises a plurality of address electrodes A1 to An arranged in the column direction, a plurality of X-electrodes X1 to Xn arranged in the row direction, and a plurality of Y-electrodes Y1 to Yn arranged in the row direction. The X-electrodes X1 to Xn are formed corresponding to the respective Y-electrodes Y1 to Yn, and their ends are coupled in common.

Additionally, the display panel 240 comprises a substrate (not shown) on which the plurality of X-electrodes X1 to Xn and the plurality of Y-electrodes Y1 to Yn are arranged, and a substrate (not shown) on which the plurality of address electrodes A1 to An are arranged. The two substrates face each other with a discharge space therebetween so that the X-electrodes X1 to Xn and the Y-electrodes Y1 to Yn are perpendicular to the address electrodes A1 to An, respectively. In this situation, discharge spaces on the crossing points of the address electrodes A1 to An, the X-electrodes X1 to Xn and the Y-electrodes Y1 to Yn form discharge cells.

The address driver 231 receives an address electrode driving signal from the controller 260, and applies an address driving voltage for selecting a desired discharge cell to each of the plurality of address electrodes A1 to An.

Additionally, the address driver 231 applies the address driving voltage sequentially to each row of the display panel 240 in a predetermined subfield period so that IR signals are detected from a surface of the display panel 240. This process is shown in FIG. 5.

Figure 5:
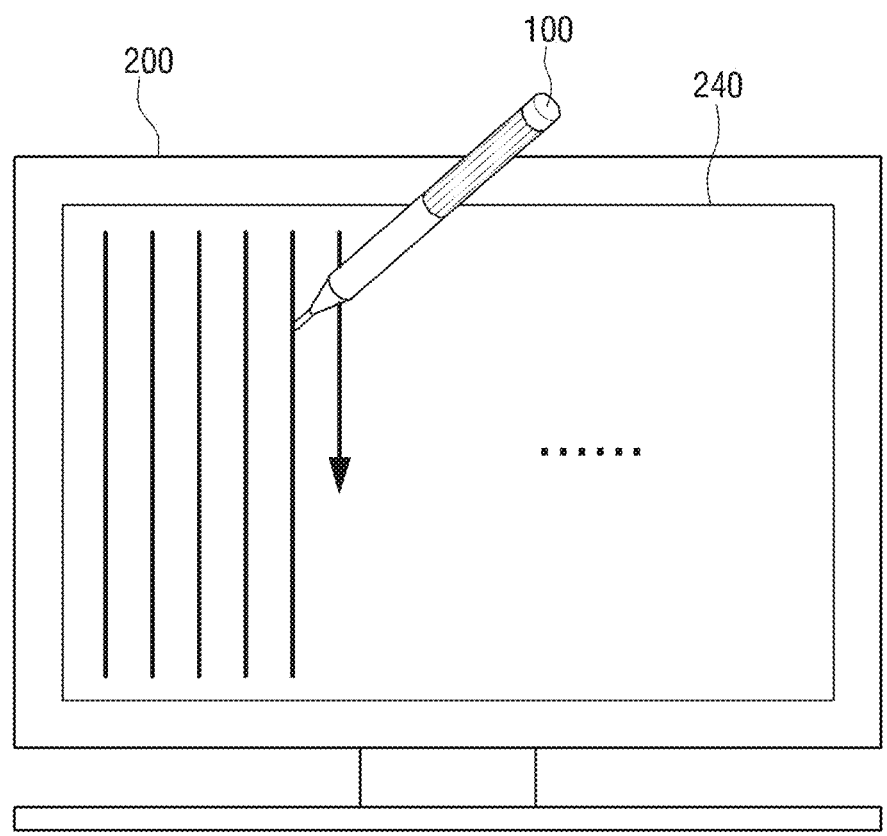
FIG. 5 is a view illustrating a screen displayed when an address driving voltage is applied to the display panel so that an infrared (IR) signal is detected in the display panel.

FIG. 5 exemplarily illustrates a screen displayed when the address driving voltage is applied to the display panel 240 so that the IR signal is detected on the display panel 240. In FIG. 5, the address driving voltage is applied to the display panel 240 at regular intervals in sequence, from left to right.

Accordingly, if a user contacts the pointing device 100 with a predetermined area on the display panel 240, the pointing device 100 may detect an IR signal on the display panel 240 at a predetermined time.

In more detail, the IR signal with directivity is emitted, and thus the pointing device 100 in contact with the predetermined area may detect the IR signal emitted from a discharge cell in the predetermined area. Therefore, there is a correlation between the area in contact with the pointing device 100 and a time at which the IR signal is detected.

In other words, if the time at which the IR signal is detected is determined, an X-axis coordinate value for the pointing device 100 may be obtained based on the time at which the reference signal is detected and the time at which the IR signal is detected.

For example, it is assumed that the pointing device 100 is disposed on the fifth column on the display panel 240 as shown in FIG. 5, and a time of about 60 μs is required for each row of the display panel 240. In this situation, if the pointing device 100 comes in contact with a predetermined screen area on the display panel 240 and if a time of about 300 μs elapses between when the reference signal is detected and when the IR signal is detected, the pointing device 100 may recognize its current location, that is the fifth column on the display panel 240. Hereinafter, the detected IR signal is referred to as a 'Y-axis IR signal' for convenience of description.

In this situation, the pointing device 100 needs to know the reference signal or the time at which the reference signal, in order to recognize its current location. The reference signal will be described below.

Referring back to FIG. 4, the X-electrode driver 233 receives an X-electrode driving control signal from the controller 260, and applies driving voltages to the X-electrodes X1 to Xn. The Y-electrode driver 235 receives a Y-electrode driving control signal from the controller 260, and applies driving voltages to the Y-electrodes Y1 to Yn. In this situation, the driving voltages are applied to the X-electrodes X1 to Xn and the Y-electrodes Y1 to Yn in an alternate manner, and thus it is possible to perform a sustain discharge for a selected discharge cell.

Figure 6:
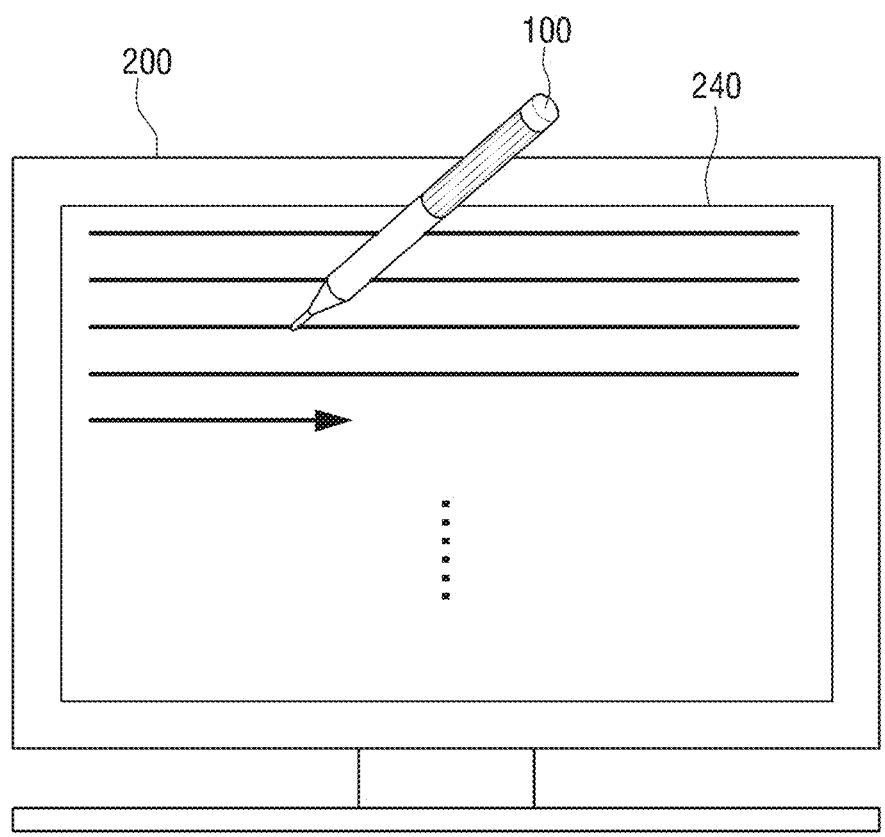
FIG. 6 is a view illustrating a screen displayed when a Y-electrode driving voltage is applied to the display panel so that an IR signal is detected in the display panel.

Additionally, the Y-electrode driver 235 applies a Y-electrode driving voltage sequentially to each column of the display panel 240 in a predetermined subfield period so that an IR signal is detected on the surface of the display panel 240. This process is shown in FIG. 6. In FIG. 6, the Y-electrode driving voltage is applied at regular intervals to the display panel 240 in sequence, from top to bottom.

Accordingly, if a user contacts the pointing device 100 with a predetermined area on the display panel 240, the pointing device 100 may detect an IR signal on the display panel 240 at a predetermined time.

In other words, if the time at which the IR signal is detected is determined, a Y-axis coordinate value for the pointing device 100 may be obtained based on a difference in time between when the reference signal is detected and when the IR signal is detected.

For example, it is assumed that the pointing device 100 is disposed on the third row on the display panel 240 as shown in FIG. 6, and a time of about 60 μs is required for each column of the display panel 240. In this situation, if the pointing device 100 comes in contact with a predetermined screen area on the display panel 240 and if a time of about 180 μs elapses between the time at which the reference signal is detected and the time at which the IR signal is detected, the pointing device 100 may recognize its current location, that is the third row on the display panel 240. Hereinafter, the detected IR signal is referred to as an 'X-axis IR signal' for convenience of description.

Additionally, if the X-axis coordinate value of the pointing device 100 shown in FIG. 5 coincides with the Y-axis coordinate value of the pointing device 100 shown in FIG. 6, it is possible for a user to know where the pointing device 100 is disposed on the display panel 240.

As described above, the location of the pointing device 100 may be determined based on the time at which the reference signal is detected, the time at which the X-axis IR signal is detected and the time at which the Y-axis IR signal is detected. Additionally, when the driving unit 230 applies the reset voltage to the display panel 240, the large EMI signal is emitted.

In the exemplary embodiment of the present invention, the EMI signal emitted when the reset voltage is applied is used as a reference signal. Accordingly, the Y-electrode driver 235 applies the reset voltage to a predetermined subfield period so that the EMI signal is detected on the surface of the display panel 240. In more detail, the reset voltage is applied to the display panel 240, before the Y-electrode driving voltage for allowing the X-axis IR signal to be emitted and the address driving voltage for allowing the Y-axis IR signal to be emitted are applied to the display panel 240.

Hereinafter, a time at which the reset voltage is applied, a time at which the Y-electrode driving voltage is applied for generation of the X-axis IR signal, and a time at which the address driving voltage is applied for generation of the Y-axis IR signal are described with reference to FIG. 7.

Figure 7:
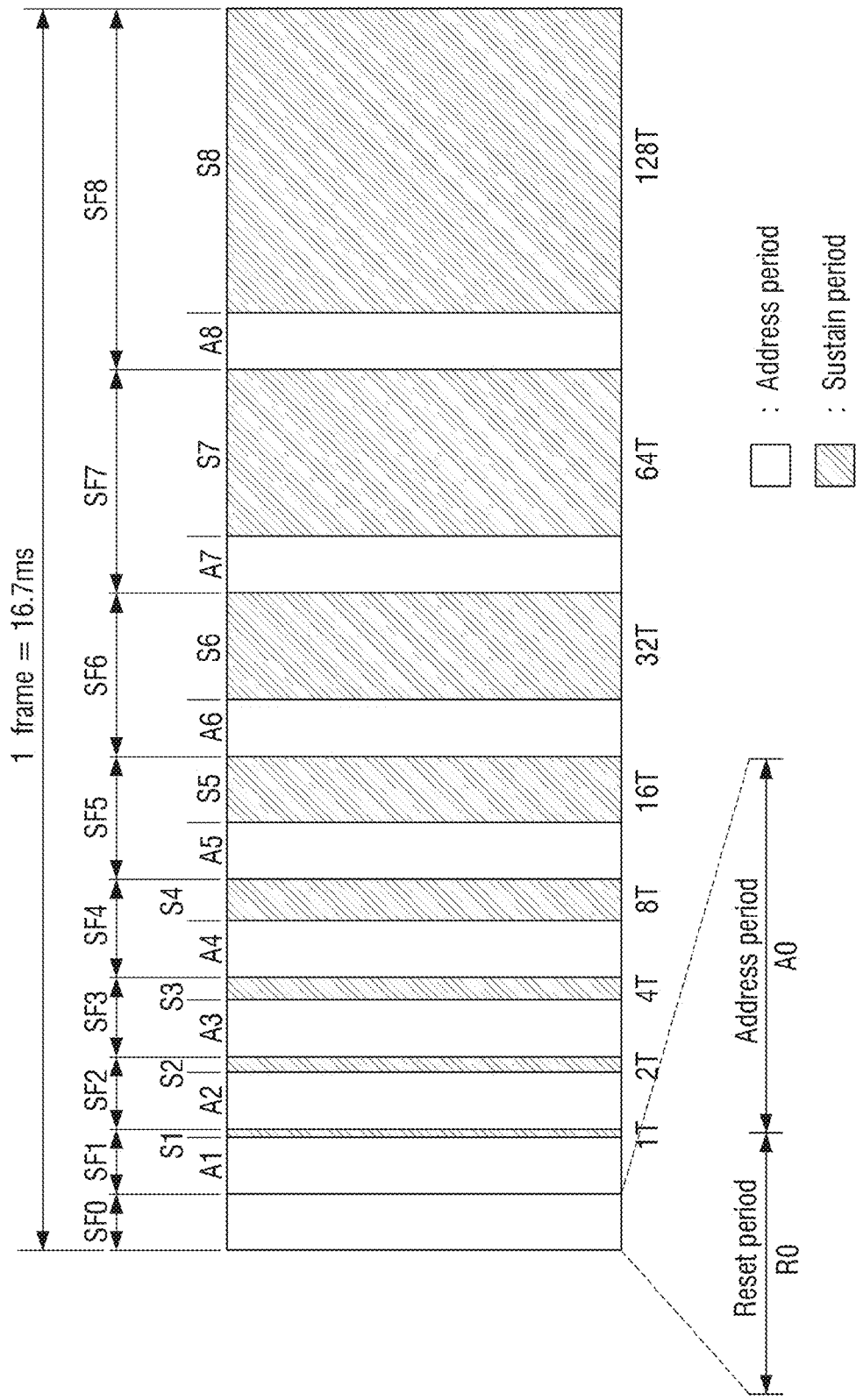
FIG. 7 is a view illustrating a plurality of subfields forming a single frame of a video.

FIG. 7 illustrates an exemplary structure of a plurality of subfields forming a single frame of video.

In FIG. 7, a single frame comprises nine subfields SF0 to SF8.

The subfields SF1 to SF8 are used to represent a video. More specifically, the video is divided into the plurality of subfields SF1 to SF8 with respective luminance weights, so as to represent gray scales. In the exemplary embodiment of the present invention, the eight subfields SF1 to SF8 have luminance weights of 1, 2, 4, 8, 16, 32, 64 and 128, respectively.

The subfields SF1 to SF8 each comprise address periods A1 to A8 and sustain periods S1 to S8 with respect to temporal operation variations. The address period refers to a period for accumulating wall charges by applying address voltages to lit cells (addressed cells) so as to divide lit cells and unlit cells on the display panel 240. The sustain period refers to a period for discharging wall charges by applying sustain discharge pulses to addressed cells so as to display images using the addressed cells. Since the subfields SF1 to SF8 have luminance weights of 1, 2, 4, 8, 16, 32, 64 and 128, respectively, the sustain periods S1 to S8 have discharge ratios of 1:2:4:8:16:32:64:128, respectively.

The subfield SF0 enables the reset voltage, the Y-electrode driving voltage, and the address driving voltage to be applied to the display panel 240, rather than being used to represent a video. The subfield SF0 is disposed in a foremost portion of each frame of the video, and is divided into a reset period R0 and an address period A0.

The reset period R0 refers to a period for initializing the state of each cell in order to smoothly perform addressing of the cell. Accordingly, in the reset period R0, the driving unit 230 applies the reset voltage to the display panel 240 to reset electric charges remaining after cell discharge, and thus a large EMI signal is emitted.

Additionally, in the address period A0, the driving unit 230 transfers to the display panel 240 the address driving voltage for generation of the Y-axis IR signal and the Y-electrode driving voltage for generation of the X-axis IR signal.

If the time, at which the EMI signal is emitted, is used as a reference time, the pointing device 100 may compute a time difference between the reference time and time at which the Y-axis IR signal is received, and a time difference between the reference time and time at which the X-axis IR signal is received, to generate its own location data regarding the location of the pointing device 100 on the display panel 240.

The structure of the subfields is merely exemplary for convenience of description. Accordingly, the present invention is also applicable to various structures of subfields other than the illustrated structure.

While a single frame comprises nine subfields, as in the exemplary embodiment of the present invention, the present invention is also applicable to a single frame comprising eight or fewer subfields or a single frame comprising nine or more subfields. Additionally, subfield SF0 is disposed in the foremost portion of the frame in the exemplary embodiment, but the present invention is also applicable to a situation in which subfield SF0 is disposed in other portions of the frame.

Furthermore, the present invention may be implemented using the reset voltage applied in the subfields SF1 to SF8 for representing video, without a need to insert a separate subfield SF0. In addition, there is no need for the reset voltage to be applied once per each frame, and accordingly, the reset voltage may be applied to a single frame twice or more.

Moreover, the pointing device 100 sets a time, at which an EMI signal having a pattern of a predetermined magnitude is emitted, to be a reference time, instead of a time at which a general EMI signal is emitted, in order to make sure that the EMI signal is received in the reset period as a reference time.

In other words, if a time at which an EMI signal is emitted without any rule or pattern is set to be a reference time, the pointing device 100 may not determine its own location. Hereinafter, a process of determining whether an EMI signal is generated by applying the reset voltage in the reset period, according to a pattern of the EMI signal in order to set an accurate reference, is described with reference to FIG. 8.

Figure 8:
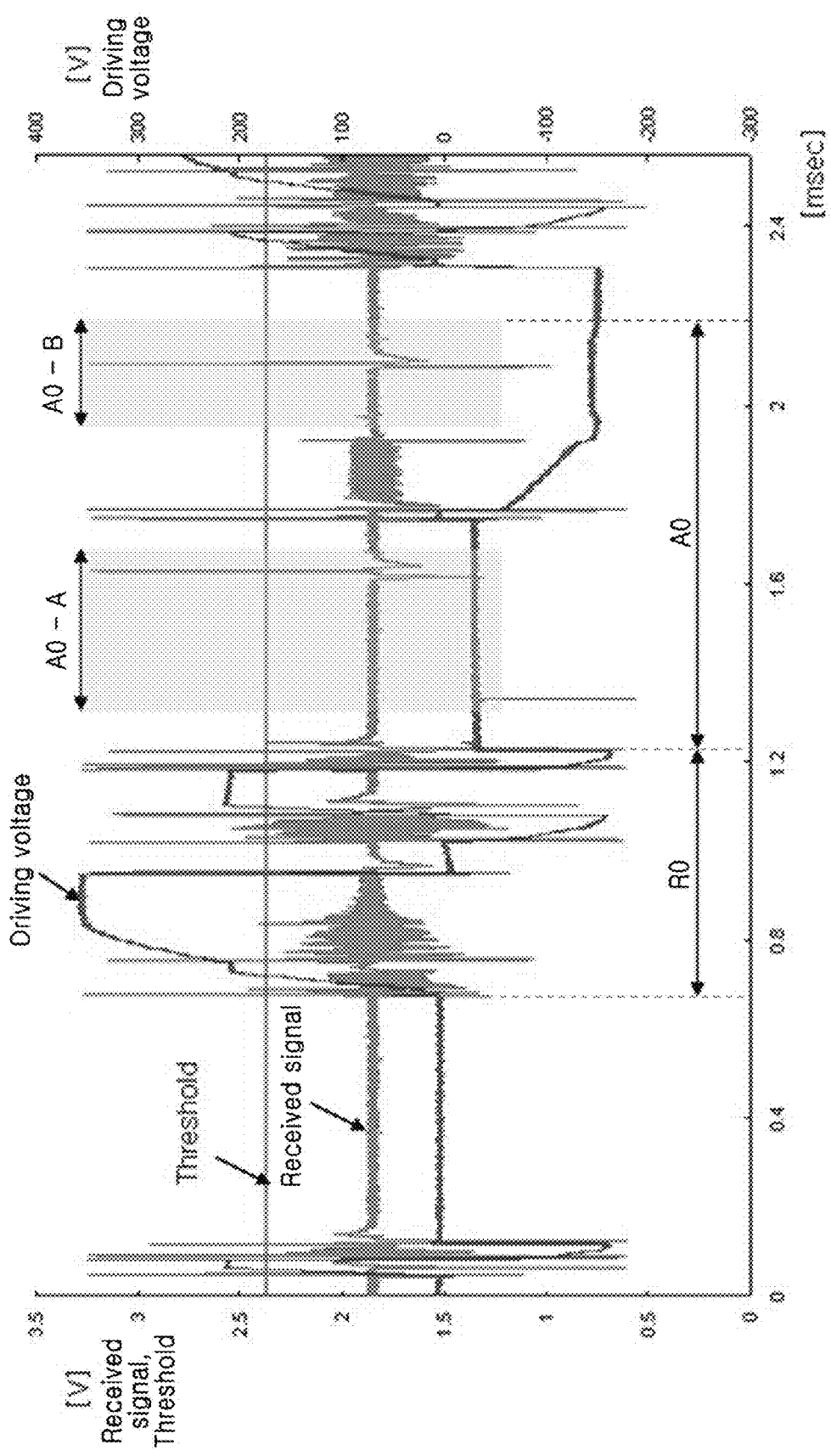
FIG. 8 is a view illustrating wavelength of a driving voltage applied to the display panel by the driving unit.

FIG. 8 is a view illustrating wavelength of a driving voltage applied to the display panel 240 by the driving unit 230. In particular, FIG. 8 illustrates the wavelength of the driving voltage in the reset period R0 and the address period A0 of the subfield SF0, and also shows wavelength of a signal received from the pointing device 100.

To reset electric charges remaining after cell discharge, if the driving unit 230 applies the driving voltage to the display panel 240 in the reset period R0, the display apparatus 200 emits an EMI signal. Then, the pointing device 100 comes in contact with the display panel 240, and receives the EMI signal. As shown in FIG. 8, during the reset period R0, the EMI signal is received.

After the EMI signal is received, the pointing device 100 extracts only a pattern in which an EMI signal with a value equal to or greater than a preset threshold is received. The pointing device 100 compares the extracted pattern with a signal pattern pre-stored therein, and determines whether the two patterns are partly or completely identical. If it is determined that two patterns are partly or completely identical, the pointing device 100 sets a part of times at which signals contained in the patterns are received to be a reference time, computes a time difference between when an X-axis IR signal is received and when a Y-axis IR signal is received, and generates its own location data using the computed time difference.

As shown in FIG. 8, in order to generate location data of the pointing device 100, if the driving unit 230 applies the driving voltage to the display panel 240 in the address period A0, the IR signal is emitted from the display panel 240 by the applied driving voltage.

In more detail, if the driving unit 230 applies the address driving voltage to the display panel 240 at regular intervals in sequence, from left to right, Y-axis IR signals are emitted from the display panel 240 in response to the applied address driving voltage. Additionally, if the driving unit 230 applies the Y-electrode driving voltage to the display panel 240 at regular intervals in sequence, from top to bottom, X-axis IR signals are emitted from the display panel 240 in response to the applied Y-electrode driving voltage.

In FIG. 8, period A0-A indicates a period in which the Y-axis IR signals are emitted from the display panel 240, and period A0-B indicates a period in which the X-axis IR signals are emitted from the display panel 240. Additionally, in period A0-A, a peak wavelength of the signal received from the pointing device 100 indicates a point where the point device 100 actually receives Y-axis IR signals from the area of the display panel 240 in contact therewith. In period A0-B, a peak wavelength of the signal received from the pointing device 100 indicates a point where the point device 100 actually receives X-axis IR signals from the area of the display panel 240 in contact therewith.

After receiving the Y-axis IR signals and X-axis IR signals, the pointing device 100 sets a part of times at which signals are received in the patterns to be a reference time, computes a time difference between when X-axis IR signals are received and when Y-axis IR signals are received, and generates its own location data using the computed time difference.

Hereinafter, a pattern comparison process and a location data generation process are described in detail with reference to FIG. 9.

Figure 9:
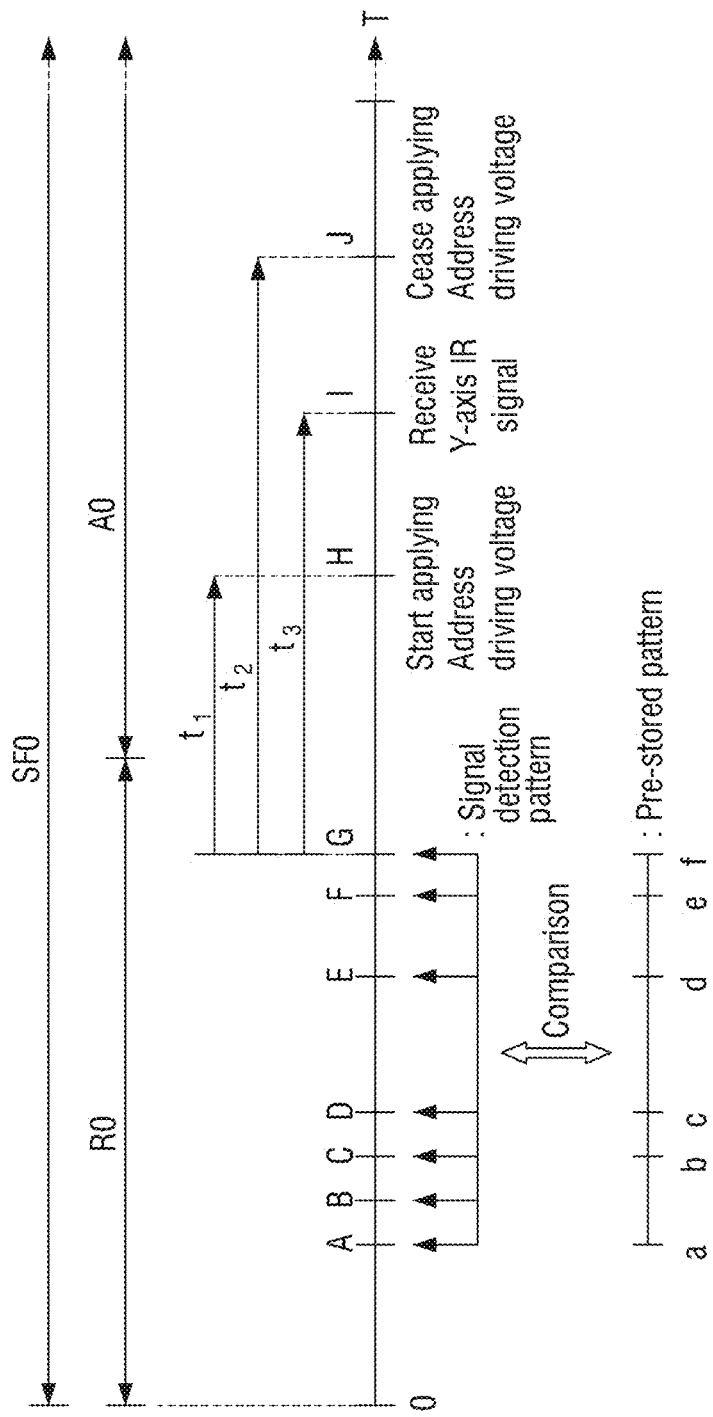
FIG. 9 is a view explaining a pattern comparison process and a location data generation process.

FIG. 9 is a view explaining a pattern comparison process and a location data generation process. The pointing device 100 checks times at which EMI signals having values equal to or greater than the preset threshold are detected, in order to generate its own location data. In FIG. 9, EMI signals having values equal to or greater than the preset threshold are detected at times A, B, C, D, E, F and G.

The pointing device 100 compares a signal detection pattern, which represents the times at which the EMI signals are detected, with the pre-stored pattern which is previously stored therein, and sets a reference time for generation of location data. In FIG. 9, the pre-stored pattern represents times a, b, c, d, e and f.

For example, as a result of comparison, the signal detection pattern is not completely identical to the pre-stored pattern due to the EMI signal detected at time B. In other words, the times A, C, D, E, F and G are identical to the times a, b, c, d, e and f. In the case when both the patterns are not completely identical but are partly identical, that is, when the signal detection pattern comprises the pre-stored pattern, the pointing device 100 determines a current period to be a reset period, and computes a time difference between when Y-axis IR signals are received and when X-axis IR signals are received, based on one of the times at which the EMI signals are detected.

Y-axis IR signals are applied in sequence to each row on the display panel 240 for a period of time from time H, at which the address driving voltage starts to be applied, to time I, at which the address driving voltage ceases to be applied. Accordingly, the Y-axis IR signals are received in address period A0 from the pointing device 100 in contact with a predetermined row on the display panel 240.

When the address driving voltage starts to be applied at time H and ceases to be applied at time I, the pointing device 100 sets time G, namely one of the times at which the EMI signals having values equal to or greater than the threshold are detected, to be a reference time, computes time period t1 from the reference time to time H, and computes time period t2 from the reference time to time J.

If a Y-axis IR signal is received at time I, the pointing device 100 computes time period t3 from the reference time to time I.

Accordingly, the pointing device 100 may know its X-axis coordinate using time periods t1, t2 and t3. For example, if time periods t1, t2 and t3 are 2 seconds, 3 seconds and 4 seconds, respectively, a Y-axis IR signal is received at an intermediate time during the period of time from time H to time J. If the entire cell comprises 300 rows on the display panel 240, a Y-axis IR signal may be received from a 150$^{th}$ row on the display panel 240.

The process of receiving Y-axis IR signals and checking the X-axis location data of the pointing device 100 has been described. A process of receiving X-axis IR signals and checking the Y-axis location data of the pointing device 100 may be performed as described above.

Figure 10:
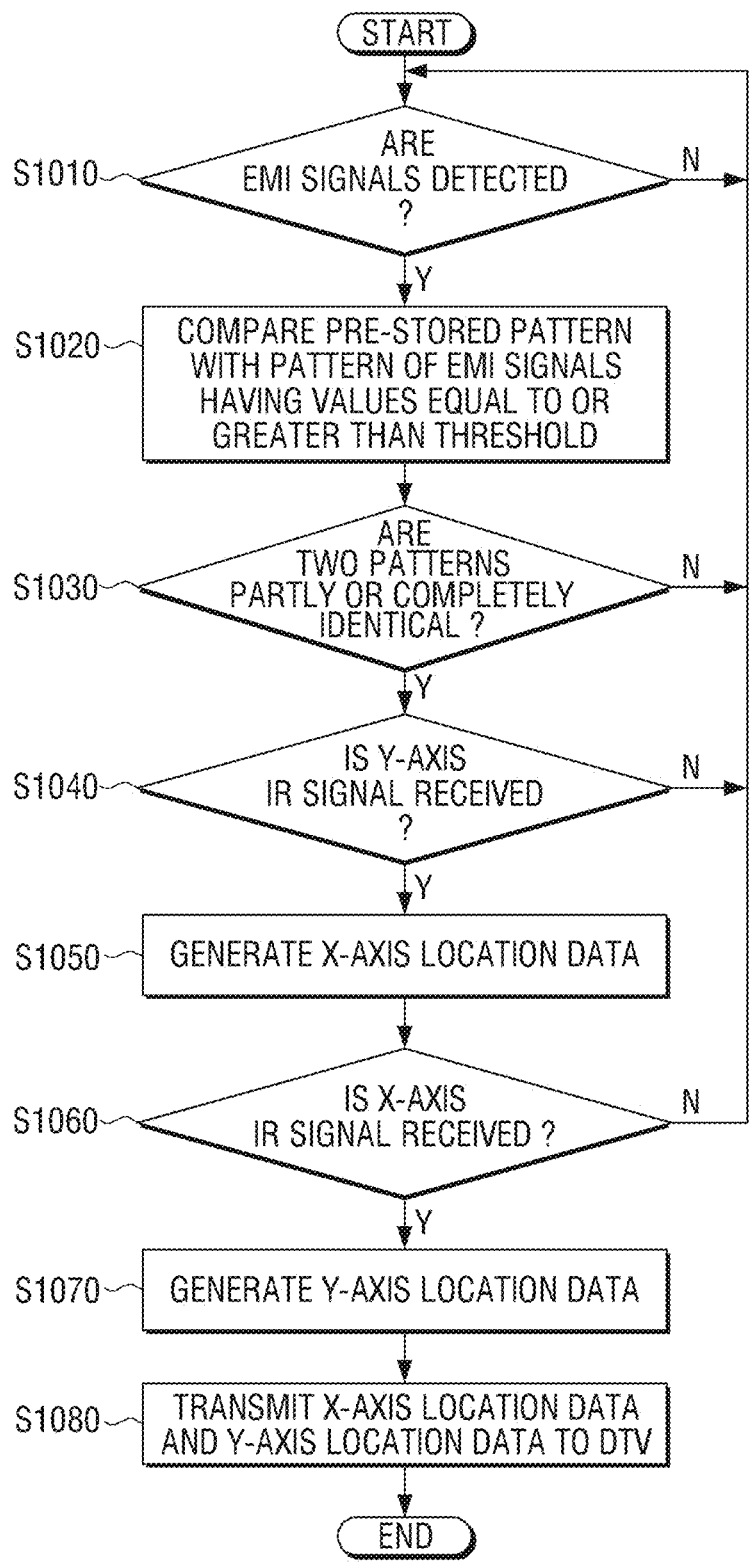
FIG. 10 is a flowchart explaining a process by which a pointing device generates its own location data according to an exemplary embodiment of the present invention.

FIG. 10 is a flowchart explaining a process by which the pointing device 100 generates its own location data according to an exemplary embodiment of the present invention.

The pointing device 100 determines whether EMI signals output from the DTV 200 are detected (S1010). If it is determined that the EMI signals are detected (S1010-Y), the pointing device 100 extracts only EMI signals having values equal to or greater than the threshold from among the detected EMI signals, and compares a pattern of the extracted EMI signals with the pre-stored pattern (S1020).

If it is determined that the two patterns are partly or completely identical as a result of comparison (S1030-Y), the pointing device 100 determines whether a Y-axis IR signal is received (S1040). If it is determined that the Y-axis IR signal is received (S1040-Y), the pointing device 100 generates its X-axis location data using a difference between a time at which the Y-axis IR signal is received and one time among times at which the EMI signals having values equal to or greater than the threshold are received (S1050).

Likewise, the pointing device 100 determines whether an X-axis IR signal is received (S1060). If it is determined that the X-axis IR signal is received (S1060-Y), the pointing device 100 generates its Y-axis location data using a difference between a time at which the X-axis IR signal is received and one time among times at which the EMI signals having values equal to or greater than the threshold are received (S1070).

Subsequently, the pointing device 100 transmits the generated X-axis location data and Y-axis location data to the DTV 200 (S1080).

Therefore, it is possible to more precisely extract a location indicated by the pointing device, and to minimize errors caused by delays that may occur when the pointing device is wirelessly connected to the display apparatus.

FIG. 11 is a flowchart explaining a process by which the DTV 200 applies a driving voltage, receives location data, and displays a video according to an exemplary embodiment of the present invention.

The DTV 200 applies the reset voltage in the subfield SF0 (S1110). After a predetermined period of time (a first time period) elapses (S1120-Y), the DTV 200 applies the address voltage in sequence to each row in each cell of the display panel 240 (S1130). Subsequently, after another predetermined period of time (a second time period) elapses (S1140-Y), the DTV 200 applies the Y-electrode driving voltage in sequence to each column in each cell of the display panel 240 (S1150).

After the location data is received from the pointing device 100 (S1160-Y), the DTV 200 allows a video to be displayed on a screen area corresponding to the received location data (S1170).

Therefore, it is possible to more precisely extract a location indicated by the pointing device, and to minimize errors caused by delays that may occur when the pointing device is wirelessly connected to the display apparatus.

The EMI signals and IR signals are used to generate the location data of the pointing device 100 in the exemplary embodiment of the present invention, but this is merely exemplary for convenience of description. Accordingly, the present invention is also applicable to using signals other than the EMI signals and IR signals.

Additionally, the pointing device 100 generates the location data and transfers the generated location data to the DTV 200 in the exemplary embodiment of the present invention, but this is merely exemplary for convenience of description. Accordingly, the present invention is also applicable to other situations. For example, when the pointing device 100 extracts only a time at which the EMI signal is received and a time at which the IR signal is received, and transfers the extracted times to the DTV 200, the DTV 200 may generate location data of the pointing device 100 using the received times. In this situation, signal patterns to be compared need to be stored in the DTV 200.

Furthermore, only signals having values equal to or greater than the threshold are extracted and signal patterns are analyzed using the extracted signals in the exemplary embodiment of the present invention, but the threshold may be changed according to user's convenience. In more detail, if a threshold is low, signal patterns may be analyzed more accurately, although a longer time is required to analyze signal patterns. Alternatively, if a threshold is high, signal patterns may be more clearly analyzed, but reliability of the analyzed patterns may be reduced.

As described above, according to an exemplary embodiment of the present invention, it is possible to more precisely extract a location indicated by the pointing device and to minimize errors caused by delays that may occur when the pointing device is wirelessly connected to the display apparatus.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A pointing device comprising:
a sensor which detects a first signal and a second signal;
a storage unit which stores a preset signal pattern; and
a controller which generates a first pattern that represents a time at which the first signal is detected, compares the preset signal pattern to the first pattern, and generates location data corresponding to a time at which the second signal is detected according to a result of comparison.

2. The pointing device as claimed in claim 1, wherein the controller sets the time at which the first signal is detected to be a reference time, and generates location data corresponding to the time at which the second signal is detected.

3. The pointing device as claimed in claim 1, wherein, if the preset signal pattern is at least partly identical to the first pattern, the controller generates the location data.

4. The pointing device as claimed in claim 1, wherein the second signal comprises an X-axis signal related to an X-axis location of the pointing device on a display and a Y-axis signal related to a Y-axis location of the pointing device on the display, and
wherein the controller generates X-axis location data of the pointing device based on a difference between the time at which the first signal is detected and a time at which the X-axis signal is detected, and generates Y-axis location data of the pointing device based on a difference between the time at which the first signal is detected and a time at which the Y-axis signal is detected.

5. The pointing device as claimed in claim 1, wherein the location data comprises information that indicates a point where the pointing device is located on a surface of a display.

6. The pointing device as claimed in claim 1, wherein the first signal is an electromagnetic interference (EMI) signal which is detected from a display.

7. The pointing device as claimed in claim 1, wherein the second signal is an infrared (IR) signal which is detected at a point where the pointing device is located on a surface of a display.

8. The pointing device as claimed in claim 1, further comprising:
a communication interface which transmits the location data to a display connected to the pointing device.

9. The pointing device as claimed in claim 8, wherein the controller determines a location of the pointing device on the display based on the location data, and controls the determined location to be transmitted via the communication interface to the display.

10. The pointing device as claimed in claim 1, wherein the first signal and the second signal are signals having values equal to or greater than a preset threshold among signals detected from a display.

11. A display apparatus comprising:
a display panel;
a driving unit which applies a driving voltage to the display panel; and
a controller which controls the driving unit to apply the driving voltage to the display panel at a first time and at a second time,
wherein the display panel emits, to an external device, a first signal having a first pattern when the driving voltage is applied at the first time and emits a second signal, which causes the external device to generate location data, when the driving voltage is applied at the second time.

12. The display apparatus as claimed in claim 11, wherein the second signal comprises a first infrared (IR) signal which is sequentially emitted from rows of cells of the display panel, and a second IR signal which is sequentially emitted from columns of cells of the display panel.

13. The display apparatus as claimed in claim 12, wherein the first IR signal is emitted at regular intervals from each row of cells of the display panel, and the second IR signal is emitted at regular intervals from each column of cells of the display panel.

14. The display apparatus as claimed in claim 12, wherein the controller controls the first IR signal to be emitted after a first preset period of time elapses based on the first signal, and controls the second IR signal to be emitted after a second preset period of time elapses based on the first signal.

15. The display apparatus as claimed in claim 11, wherein the controller controls the first signal and the second signal to be emitted in a predetermined subfield among a plurality of subfields forming a single frame of a video.

16. The display apparatus as claimed in claim 15, wherein the predetermined subfield is disposed on a foremost portion of the frame and
    does not contain video data, and the other subfields contain video data.

17. The display apparatus as claimed in claim 11, wherein the controller controls the first signal to be emitted in a reset period of a cell provided in the display panel, and controls the second signal to be emitted in an address period of the cell.

18. The display apparatus as claimed in claim 11, wherein the first signal is an electromagnetic interference (EMI) signal which is emitted in response to the applied driving voltage.

19. The display apparatus as claimed in claim 11, further comprising:
    a communication interface which receives the location data regarding a location of the external device on the display apparatus from the external device,
    wherein the controller controls the display panel to display an output at the location using the received location data.

20. A display method comprising:
    emitting a first signal having a first pattern;
    emitting a second signal;
    detecting the first signal and second signal, and generating, if the first pattern is at least partly identical to a prestored pattern, data regarding a location on a display in which the first signal and second signal are detected based on the second signal; and
    displaying an output based on the generated data at the location.

21. A pointing device comprising:
    a sensor which detects a first signal and a second signal;
    a storage unit which stores a preset signal pattern; and
    a controller which generates a first pattern based on the detected first signal, determines a reference time by comparing the preset signal pattern to the first pattern, and generates location data corresponding to a time at which the second signal is detected and the reference time.

22. A display apparatus comprising:
    a display panel;
    a driving unit which applies a driving voltage to the display panel; and
    a controller which controls the driving unit to apply the driving voltage to the display panel at a first time and at a second time,
    wherein the display panel emits a first signal having a first pattern when the driving voltage is applied at the first time and emits a second signal when the driving voltage is applied at the second time,
    wherein the second signal comprises a first infrared (IR) signal which is sequentially emitted from rows of cells of the display panel, and a second IR signal which is sequentially emitted from columns of cells of the display panel.

23. A display apparatus comprising:
    a display panel;
    a driving unit which applies a driving voltage to the display panel; and
    a controller which controls the driving unit to apply the driving voltage to the display panel at a first time and at a second time,
    wherein the display panel emits a first signal having a first pattern when the driving voltage is applied at the first time and emits a second signal when the driving voltage is applied at the second time,
    wherein the first signal is an electromagnetic interference (EMI) signal which is emitted in response to the applied driving voltage.

* * * * *